US009985553B2

United States Patent
Matsuoka et al.

(10) Patent No.: US 9,985,553 B2
(45) Date of Patent: May 29, 2018

(54) CONTROL DEVICE OF INVERTER

(71) Applicant: TOSHIBA MITSUBISHI-ELECTRIC INDUSTRIAL SYSTEMS CORPORATION, Chuo-ku (JP)

(72) Inventors: Yuji Matsuoka, Chuo (JP); Tatsuaki Ambo, Chuo (JP)

(73) Assignee: TOSHIBA MITSUBISHI—ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days. days.

(21) Appl. No.: 15/543,140

(22) PCT Filed: Jan. 13, 2015

(86) PCT No.: PCT/JP2015/050628
§ 371 (c)(1),
(2) Date: Jul. 12, 2017

(87) PCT Pub. No.: WO2016/113838
PCT Pub. Date: Jul. 21, 2016

(65) Prior Publication Data
US 2018/0006579 A1 Jan. 4, 2018

(51) Int. Cl.
*H02M 7/53* (2006.01)
*H02M 7/5395* (2006.01)
*H02M 1/42* (2007.01)

(52) U.S. Cl.
CPC ........... *H02M 7/5395* (2013.01); *H02M 1/42* (2013.01)

(58) Field of Classification Search
CPC ............................... H02M 7/5395; H02M 1/42
See application file for complete search history.

(56) References Cited

U.S. PATENT DOCUMENTS

| 2013/0077366 | A1* | 3/2013 | Kim | H01L 31/02021 363/95 |
| 2013/0107594 | A1* | 5/2013 | Wagoner | H02J 3/383 363/97 |
| 2013/0155739 | A1* | 6/2013 | Itako | G05F 1/67 363/95 |

FOREIGN PATENT DOCUMENTS

| JP | 9-258838 A | 10/1997 |
| JP | 11-122818 A | 4/1999 |

(Continued)

OTHER PUBLICATIONS

International Search Report dated Apr. 7, 2015 in PCT/JP2015/050628.

(Continued)

*Primary Examiner* — Emily P Pham
(74) *Attorney, Agent, or Firm* — Oblon, McClelland, Maier & Neustadt, L.L.P.

(57) ABSTRACT

A control device (2) of an inverter converts electrical power generated by a solar cell (3) into alternating current power connecting to an electric power system (7). The control device includes: an alternating current voltage sensor (14) sensing a system voltage (Vr) of the electric power system; an MPPT executer (23) controlling a direct current voltage (Vdc) applied to the inverter (1) to cause the electrical power output from the solar cell (3) to be a maximum when the direct current voltage (Vdc) is higher than a lower limit (VL); a direct current voltage lower limit calculator 22 reducing the lower limit (VL) when the system voltage (Vr) is lower than a predetermined voltage; and an electrical power controller (25) controlling reactive power based on the system voltage (Vr), the reactive power being output from the inverter (1).

5 Claims, 3 Drawing Sheets

(56) References Cited

FOREIGN PATENT DOCUMENTS

| JP | 2008-182836 A | 8/2008 |
|---|---|---|
| JP | 2012-252537 A | 12/2012 |

OTHER PUBLICATIONS

Japanese Office Action dated Feb. 6, 2018 in Japanese Application No. 2016-569146 (partial English translation), 2 pages.

* cited by examiner

CONTROL DEVICE OF INVERTER

FIELD

Embodiments relate to a control device of an inverter for a solar power generation.

BACKGROUND

Generally, in a solar power generation system, an inverter is used to connect to an electric power system. The inverter converts direct current power generated by the solar cell into alternating current power synchronous with the electric power system, and supplies the alternating current power to the electric power system.

For example, to prevent the reverse flow of the output current, a system-connected device has been discussed in which the system voltage is sensed, and a voltage step-up circuit is controlled to provide an optimal stepped-up voltage that is higher than the sensed system voltage by the amount of a predetermined voltage value (e.g., referring to Patent Document 1).

However, when performing maximum power point tracking (MPPT, maximum power point tracking) of the inverter to cause the electrical power output from the solar cell to be a maximum, the lower limit of the direct current voltage is preset. Therefore, when operating, even if the inverter is in a state in which the inverter is operatable at a direct current voltage lower than the lower limit, the control device of the inverter cannot control at a direct current voltage lower than the preset lower limit.

CITATION LIST

Patent Literature

[PTL 1]
JP-A 1999-122818

SUMMARY

An object of the invention is to provide a control device of an inverter having a wider range of control causing the electrical power output from the solar cell to be a maximum.

According to one embodiment, a control device of an inverter converts electrical power generated by a solar cell into alternating current power connecting to an electric power system. The control device includes a system voltage sensing part, a direct current voltage control part, a lower limit determination part, and a reactive power control part. The system voltage sensing part senses a system voltage of the electric power system. The direct current voltage control part controls a direct current voltage to cause the electrical power output from the solar cell to be a maximum when the direct current voltage is higher than a lower limit. The direct current voltage is applied to the inverter. The lower limit determination part reduces the lower limit when the system voltage sensed by the system voltage sensing part is lower than a predetermined voltage. The reactive power control part controls reactive power output from the inverter. The reactive power control part controls reactive power based on the system voltage sensed by the system voltage sensing part. The reactive power is output from the inverter.

DESCRIPTION OF EMBODIMENTS

Embodiments of the invention will now be described with reference to the drawings.

First Embodiment

Figure 1:
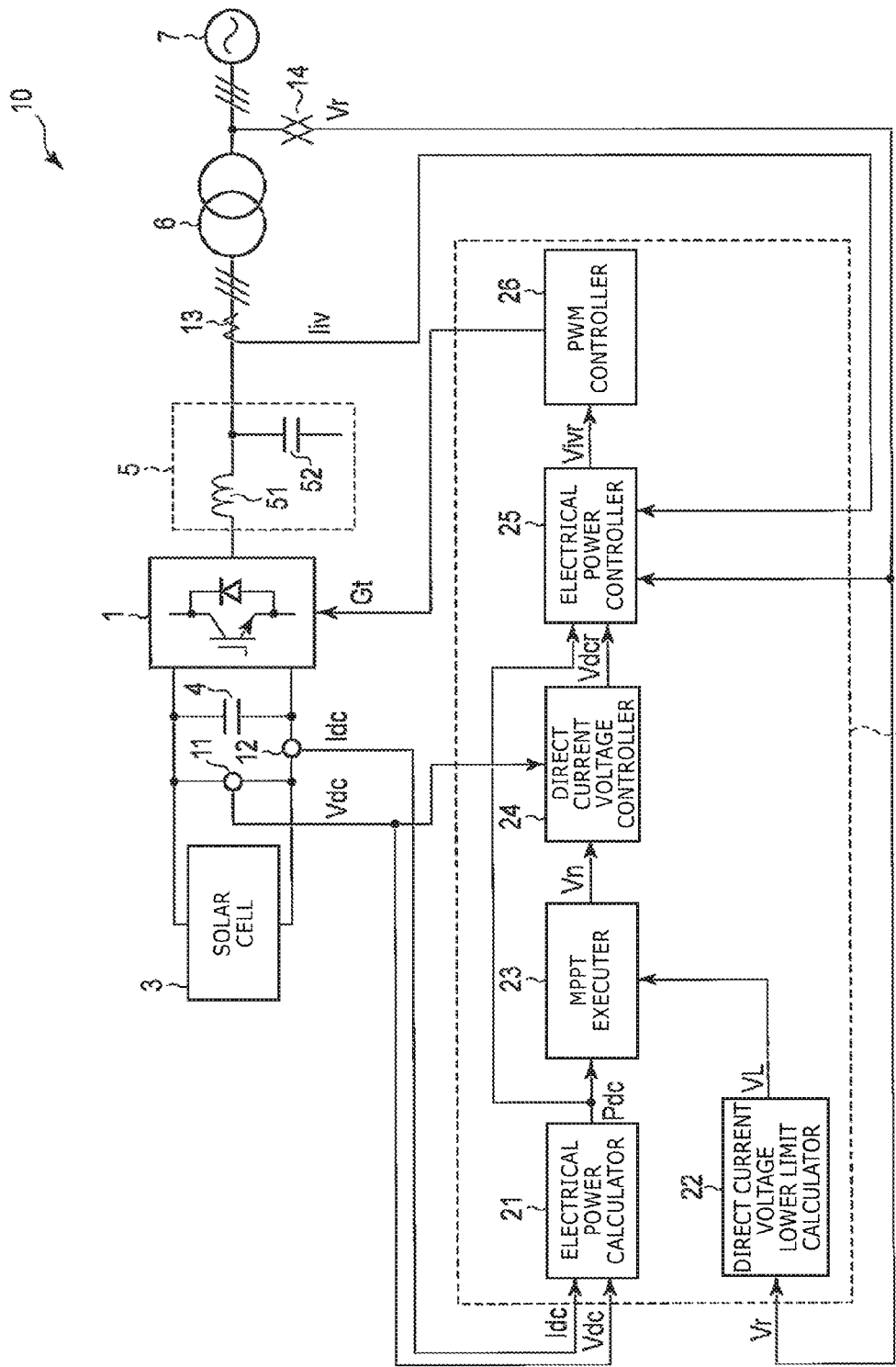
FIG. 1 is a configuration diagram showing a configuration of a solar power generation system to which a control device according to a first embodiment of the invention is applied.

FIG. 1 is a configuration diagram showing a configuration of a solar power generation system 10 to which a control device 2 according to a first embodiment of the invention is applied. The same portions in the drawings are marked with the same reference numerals; a detailed description is omitted; and the different portions are mainly described.

The solar power generation system 10 includes an inverter 1, the control device 2, a solar cell 3, a smoothing condenser 4, an alternating current filter 5, a connection transformer 6, an electric power system 7, a direct current voltage sensor 11, a direct current sensor 12, an alternating current sensor 13, and an alternating current voltage sensor 14.

The solar cell 3 is a cell that generates electricity due to light (sunlight). The solar cell 3 supplies the generated electrical power to the inverter 1. The solar cell 3 is connected to the direct current side of the inverter 1 without a voltage step-up circuit such as a chopper, etc., interposed.

The inverter 1 converts the direct current power supplied from the solar cell 3 into three-phase alternating current power that is synchronous with the electric power system 7. The inverter 1 supplies, to the electric power system 7, the alternating current power converted via the connection transformer 6. The power conversion control of the inverter 1 is performed by pulse width modulation (PWM, pulse width modulation) by a gate signal Gt output from the control device 2. The inverter 1 is, for example, a PCS (power conditioning system).

The smoothing condenser 4 is provided on the direct current side (the input side) of the inverter 1. The smoothing condenser 4 smoothes the direct current voltage supplied to the inverter 1 from the solar cell 3.

The alternating current filter 5 includes a reactor 51 and a condenser 52. The alternating current filter 5 suppresses the harmonic output from the inverter 1.

The direct current voltage sensor 11 is a sensor for measuring a voltage Vdc on the direct current side of the inverter 1 (the voltage of the smoothing condenser 4). The direct current voltage sensor 11 outputs the sensed direct current voltage Vdc to the control device 2.

The direct current sensor 12 is a sensor for measuring a current Idc flowing on the direct current side of the inverter 1. The direct current sensor 12 outputs the sensed direct current Idc to the control device 2.

The alternating current sensor 13 is a sensor for measuring a current Iiv on the alternating current side (the output side) of the inverter 1. The alternating current sensor 13 outputs the sensed alternating current Iiv to the control device 2.

The alternating current voltage sensor 14 is a sensor for measuring a system voltage Vr of the electric power system 7. The alternating current voltage sensor 14 outputs the sensed system voltage Vr to the control device 2.

The control device 2 controls the reactive power and the active power output from the inverter 1. The control device 2 includes an electrical power calculator 21, a direct current voltage lower limit calculator 22, an MPPT executer 23, a direct current voltage controller 24, an electrical power controller 25, and a PWM controller 26.

The electrical power calculator 21 calculates a direct current power Pdc based on the direct current voltage Vdc sensed by the direct current voltage sensor 11 and the direct current Idc sensed by the direct current sensor 12. The electrical power calculator 21 outputs the calculated direct current power Pdc to the MPPT executer 23.

The direct current voltage lower limit calculator 22 determines a lower limit VL of the direct current voltage Vdc of the inverter 1 based on the system voltage Vr sensed by the alternating current voltage sensor 14. The control device 2 controls the direct current voltage Vdc in a range not to fall below the determined lower limit VL. The lower limit VL is set to a value with respect to the sensed system voltage Vr such that, at least, the output current Iiv of the inverter 1 does not have a reverse flow. In addition to the output current Iiv not having a reverse flow, it is desirable to determine the lower limit VL to be a value such that the waveform of the output current Iiv is not distorted. Whether or not the value is a value such that the waveform of the output current Iiv is not distorted can be determined from the superimposition rate of each harmonic, etc. The lower limit VL decreases when the system voltage Vr decreases. The direct current voltage lower limit calculator 22 determines the preset value to be the lower limit VL if the system voltage Vr is not less than a preset threshold (e.g., the rated voltage). If the system voltage Vr is lower than the preset threshold, the direct current voltage lower limit calculator 22 calculates the lower limit VL based on the system voltage Vr. The direct current voltage lower limit calculator 22 outputs the preset lower limit VL or the calculated lower limit VL to the MPPT executer 23.

Here, the reason for calculating the lower limit VL of the direct current voltage Vdc when the system voltage Vr is decreasing will be described. The lower limit VL of the direct current voltage Vdc at which the inverter 1 is operatable is determined using the alternating current voltage output by the inverter 1. The reactive power that is output by the inverter 1 becomes inductive (inductive) when the system voltage Vr decreases. In the case where the inductive reactive power is output from the inverter 1, the output voltage of the inverter 1 decreases. Accordingly, the lower limit VL of the direct current voltage Vdc of the inverter 1 also can be reduced.

The MPPT executer 23 outputs, to the direct current voltage controller 24, a voltage increase/decrease signal Vn that increases or reduces the direct current voltage based on the direct current power Pdc calculated by the electrical power calculator 21, the lower limit VL calculated by the direct current voltage lower limit calculator 22, and a preset upper limit VH. The MPPT executer 23 outputs the voltage increase/decrease signal Vn determined by the maximum power point tracking.

Figure 2:
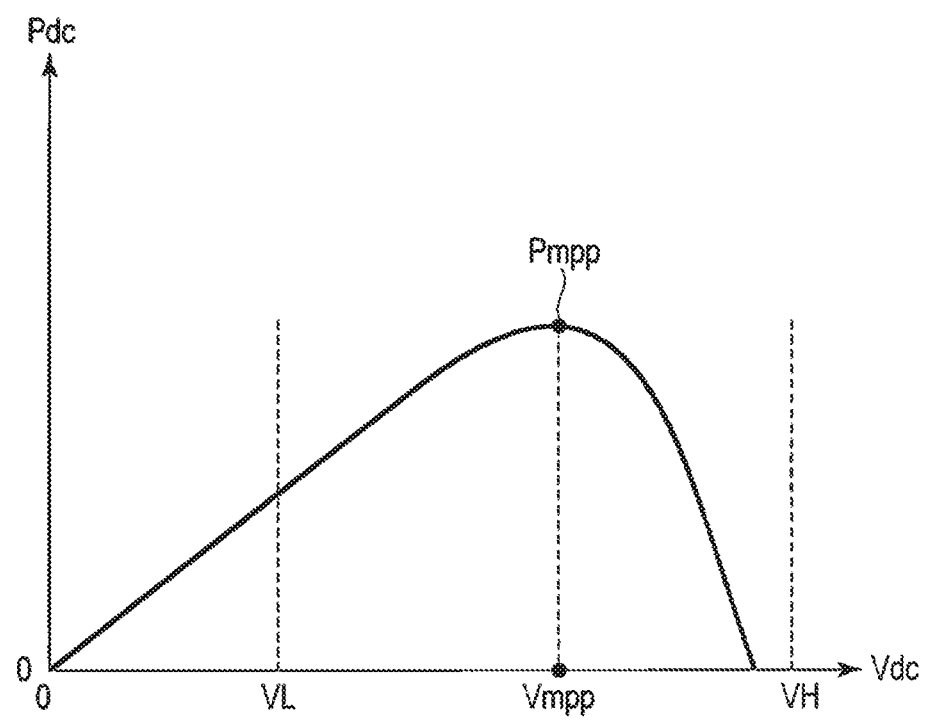
FIG. 2 is a characteristic diagram showing a characteristic of the generated electrical power of the solar cell according to the embodiment.

The control of the direct current voltage Vdc by the MPPT executer 23 will now be described with reference to FIG. 2. FIG. 2 is a characteristic diagram showing a characteristic of the generated electrical power of the solar cell 3 according to the embodiment.

Here, in the characteristic diagram of FIG. 2, a voltage (a maximum power point voltage) Vmpp at a maximum power point Pmpp is between the lower limit VL and the upper limit VH; but according to the power generation state of the solar cell 3, there are cases where the maximum power point voltage Vmpp is not between the lower limit VL and the upper limit VH.

When the direct current voltage Vdc is between the lower limit VL and the upper limit VH, the MPPT executer 23 performs the control (the maximum power point tracking) of tracking the maximum power point voltage Vmpp shown in FIG. 2 as follows.

First, the MPPT executer 23 measures the direct current power Pdc at the current direct current voltage Vdc.

Then, the MPPT executer 23 outputs the voltage increase/decrease signal Vn to step-up or step-down the direct current voltage Vdc by one predetermined level of voltage. After the step-up (or after the step-down) of the direct current voltage Vdc, the MPPT executer 23 measures the direct current power Pdc. The MPPT executer 23 compares the direct current power Pdc measured the previous time and the direct current power Pdc newly measured this time.

As the result of the comparison, in the case where the direct current power Pdc newly measured this time is higher, the MPPT executer 23 outputs the same voltage increase/decrease signal Vn as the previous time. In other words, if the voltage increase/decrease signal Vn of the previous time is a signal that steps-up the voltage, the voltage increase/decrease signal Vn this time also is output as a signal that steps-up the voltage. If the voltage increase/decrease signal Vn of the previous time is a signal that steps-down the voltage, the voltage increase/decrease signal Vn this time also is output as a signal that steps-down the voltage. On the other hand, in the case where the direct current power Pdc newly measured this time is lower, the MPPT executer 23 outputs the voltage increase/decrease signal Vn that is the opposite of the previous time.

By repeating the method recited above, the MPPT executer 23 controls the direct current voltage Vdc to be constantly at the vicinity of the maximum power point voltage Vmpp.

In the case where the direct current voltage Vdc falls below the lower limit VL when outputting the voltage increase/decrease signal Vn to reduce the voltage, the MPPT executer 23 outputs the voltage increase/decrease signal Vn to step-up the voltage regardless of the measurement result of the direct current power Pdc. Also, in the case where the direct current voltage Vdc exceeds the upper limit VH when outputting the voltage increase/decrease signal Vn to step-up the voltage, the MPPT executer 23 outputs the voltage increase/decrease signal Vn to step-down the voltage regardless of the measurement result of the direct current power Pdc.

The direct current voltage Vdc sensed by the direct current voltage sensor 11 and the voltage increase/decrease signal Vn determined by the MPPT executer 23 are input to the direct current voltage controller 24. The direct current voltage controller 24 calculates a direct current voltage command value Vdcr for controlling the direct current voltage Vdc based on the direct current voltage Vdc and the voltage increase/decrease signal Vn. The direct current voltage controller 24 outputs the calculated direct current voltage command value Vdcr to the electrical power controller 25.

The output current Iiv sensed by the alternating current sensor 13, the system voltage Vr of the electric power system 7 sensed by the alternating current voltage sensor 14, the direct current power Pdc calculated by the electrical power calculator 21, and the direct current voltage command value Vdcr calculated by the direct current voltage controller 24 are input to the electrical power controller 25. The electrical power controller 25 calculates the active power command value for controlling the active power output from the inverter 1 based on the output current Iiv, the direct current power Pdc, and the direct current voltage command value Vdcr. Also, the electrical power controller 25 calculates the reactive power command value for controlling the reactive power output from the inverter 1 based on the system voltage Vr. The electrical power controller 25 calculates a voltage command value Vivr for controlling the three-phase alternating current voltage output from the inverter 1 based on the calculated reactive power command value and active power command value. The electrical power controller 25 outputs the calculated voltage command value Vivr to the PWM controller 26.

The voltage command value Vivr that is calculated by the electrical power controller 25 is input to the PWM controller 26. The PWM controller 26 generates the gate signal Gt that drives the switching element of the inverter 1 to cause the output voltage of the inverter 1 to track the voltage command value Vivr. The PWM controller 26 performs PWM control of the inverter 1 by the generated gate signal Gt.

According to the embodiment, because the lower limit VL of the range of the direct current voltage Vdc in which the MPPT is executed decreases in the case where the system voltage Vr has a voltage drop, the range in which the MPPT is executed can be set to be wide. Accordingly, in the case where the maximum power point voltage Vmpp is lower than the lower limit VL, the electrical power that is output from the solar cell 3 can be increased by reducing the lower limit VL.

Also, by calculating the lower limit VL of the direct current voltage Vdc based on the system voltage Vr, the execution range of the MPPT can be set to be wide according to the current system voltage Vr.

Second Embodiment

Figure 3:
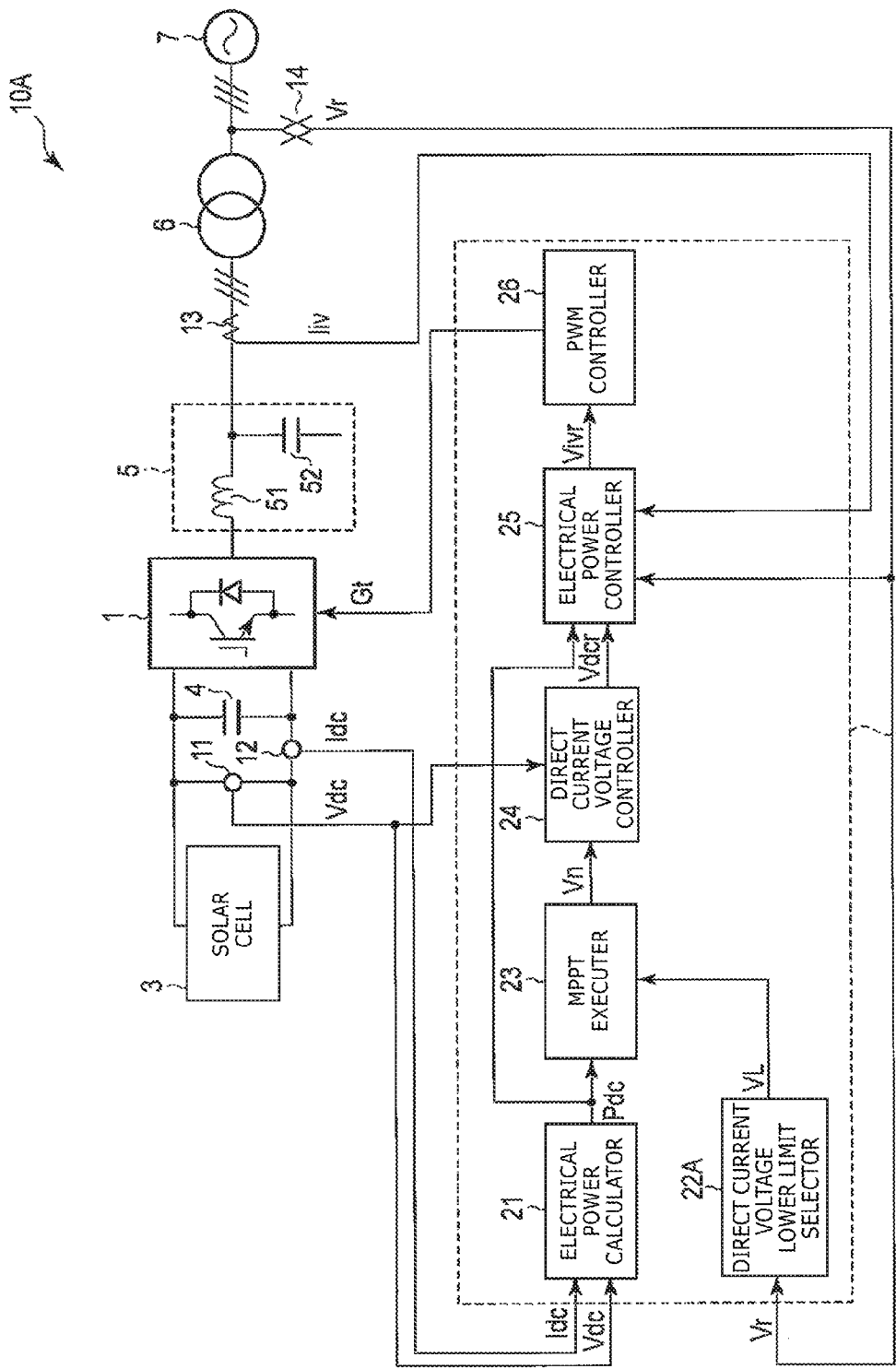
FIG. 3 is a configuration diagram showing the configuration of a solar power generation system to which a control device according to a second embodiment of the invention is applied.

FIG. 3 is a configuration diagram showing the configuration of a solar power generation system 10A to which a control device 2A according to a second embodiment of the invention is applied.

The solar power generation system 10A is the solar power generation system 10 according to the first embodiment shown in FIG. 1 in which the control device 2 is replaced with the control device 2A. The control device 2A is the control device 2 according to the first embodiment in which the direct current voltage lower limit calculator 22 is replaced with a direct current voltage lower limit selector 22A. Otherwise, the embodiment is similar to the first embodiment.

The direct current voltage lower limit selector 22A determines the lower limit VL of the direct current voltage Vdc of the inverter 1 based on the system voltage Vr sensed by the alternating current voltage sensor 14. In the direct current voltage lower limit selector 22A, the lower limits VL that correspond to each level of the system voltage Vr are preset. For example, the system voltage Vr is divided into a level that is the rated voltage or greater, and into multiple levels subdivided for multiple voltage ranges that are less than the rated voltage. The direct current voltage lower limit selector 22A determines the voltage range of the level to which the sensed system voltage Vr belongs. The direct current voltage lower limit selector 22A selects the lower limit VL corresponding to the determined level from among the multiple preset lower limits VL. The direct current voltage lower limit selector 22A outputs the selected lower limit VL to the MPPT executer 23. Otherwise, the direct current voltage lower limit selector 22A is similar to the direct current voltage lower limit calculator 22 according to the first embodiment.

According to the embodiment, operations and effects similar to those of the first embodiment can be obtained.

Also, by using the configuration in which one lower limit VL is selected from among the multiple preset lower limits VL based on the system voltage Vr, the calculation load when operating of the control device 2A can be less than that of the first embodiment.

Although a configuration is used in the embodiments in which the control device 2A constantly performs the reactive power control, there may be a function of stopping the reactive power control. In such a case, the direct current voltage lower limit calculator 22 according to the first embodiment or the direct current voltage lower limit selector 22A according to the second embodiment may execute the processing using, as a condition, the reception of a signal indicating that the reactive power control is being executed.

The invention is not limited as-is to the embodiments recited above and can be embodied in practice by modifying the components without departing from the spirit of the embodiments. Also, various inventions can be configured by appropriate combinations of the multiple components disclosed in the embodiments recited above. For example, several components may be deleted from all of the components shown in the embodiments. Further, the components may be appropriately combined between different embodiments.

The invention claimed is:

1. A control device of an inverter converting electrical power generated by a solar cell into alternating current power connecting to an electric power system, the control device comprising:
   a system voltage sensing part sensing a system voltage of the electric power system;
   a direct current voltage control part controlling a direct current voltage to cause the electrical power output from the solar cell to be a maximum when the direct current voltage is higher than a lower limit, the direct current voltage being applied to the inverter;
   a lower limit determination part reducing the lower limit when the system voltage sensed by the system voltage sensing part is lower than a predetermined voltage; and
   a reactive power control part controlling reactive power based on the system voltage sensed by the system voltage sensing part, the reactive power being output from the inverter.

2. The control device of the inverter according to claim 1, wherein the lower limit determination part calculates the lower limit based on the system voltage.

3. The control device of the inverter according to claim 1, wherein the lower limit determination part selects one of a preset plurality of values as the lower limit based on the system voltage.

4. A solar power generation system, comprising:
   a solar cell;
   an inverter converting electrical power generated by the solar cell into alternating current power connecting to an electric power system;
   a system voltage sensing part sensing a system voltage of the electric power system;
   a direct current voltage control part controlling a direct current voltage to cause the electrical power output from the solar cell to be a maximum when the direct current voltage is higher than a lower limit, the direct current voltage being applied to the inverter;

a lower limit determination part reducing the lower limit when the system voltage sensed by the system voltage sensing part is lower than a predetermined voltage; and a reactive power control part controlling reactive power based on the system voltage sensed by the system voltage sensing part, the reactive power being output from the inverter.

5. A method for controlling an inverter converting electrical power generated by a solar cell into alternating current power connecting to an electric power system, the method comprising:

sensing a system voltage of the electric power system;

controlling a direct current voltage to cause the electrical power output from the solar cell to be a maximum when the direct current voltage is higher than a lower limit, the direct current voltage being applied to the inverter;

reducing the lower limit when the sensed system voltage is lower than a predetermined voltage; and controlling reactive power output from the inverter, the controlling being based on the sensed system voltage.

* * * * *